United States Patent
Takachi et al.

(10) Patent No.: US 9,845,134 B2
(45) Date of Patent: Dec. 19, 2017

(54) BICYCLE REAR DERAILLEUR WITH A MOTION RESISTING STRUCTURE

(75) Inventors: Takeshi Takachi, Kawachinagano (JP); Atsushi Iizuka, Osaka (JP); Nobukatsu Hara, Izumisano (JP)

(73) Assignee: Shimano, Inc., Sakai, Osaka (JP)

( * ) Notice: Subject to any disclaimer, the term of this patent is extended or adjusted under 35 U.S.C. 154(b) by 791 days.

(21) Appl. No.: 12/193,184

(22) Filed: Aug. 18, 2008

(65) Prior Publication Data
US 2009/0054183 A1    Feb. 26, 2009

(30) Foreign Application Priority Data

Aug. 24, 2007   (DE) .................. 10 2007 040 156

(51) Int. Cl.
| | |
|---|---|
| *B62M 9/16* | (2006.01) |
| *B62M 9/121* | (2010.01) |
| *B62M 9/1248* | (2010.01) |
| *B62M 9/00* | (2006.01) |
| *B62M 9/124* | (2010.01) |

(52) U.S. Cl.
CPC .............. *B62M 9/16* (2013.01); *B62M 9/121* (2013.01); *B62M 9/1248* (2013.01); *B62M 2009/007* (2013.01); *B62M 2009/12406* (2013.01)

(58) Field of Classification Search
CPC ...... B62M 9/16; B62M 9/1248; B62M 9/121; B62M 2009/12406; B62M 2009/007
USPC ................................ 474/80, 82; 188/71.5, 26
See application file for complete search history.

(56) References Cited

U.S. PATENT DOCUMENTS

| | | | | |
|---|---|---|---|---|
| 75,227 | A | * | 3/1868 | Weston ...................... 192/12 R |
| 1,748,237 | A | | 2/1930 | Martin |
| 4,392,840 | A | | 7/1983 | Radocaj |
| 4,406,643 | A | * | 9/1983 | Shimano ...................... 474/82 |
| 4,530,677 | A | * | 7/1985 | Nagano ........................ 474/80 |
| 5,551,534 | A | * | 9/1996 | Smithberger et al. ........ 188/71.5 |
| 5,662,197 | A | | 9/1997 | Tabe |
| 6,135,904 | A | | 10/2000 | Guthrie |

(Continued)

FOREIGN PATENT DOCUMENTS

| | | |
|---|---|---|
| DE | 29500597.1 U1 | 4/1995 |
| DE | 20009895 U1 | 12/2000 |

(Continued)

OTHER PUBLICATIONS

German search report for DE 102007040156.8, the German application that corresponds to this application, dated Oct. 17, 2008.

(Continued)

*Primary Examiner* — Michael E Mansen
*Assistant Examiner* — Juan Campos, Jr.
(74) *Attorney, Agent, or Firm* — James A. Deland (57) ABSTRACT

A bicycle derailleur comprises a base member adapted to be mounted to a bicycle, a movable member movably coupled to the base member, and a chain guide coupled to the movable member. The chain guide is coupled for rotation around a rotational axis (X), and a biasing element biases the chain guide in a selected rotational direction. A resistance applying unit applies a resistance to rotational movement of the chain guide in a direction opposite the selected rotational direction, and an adjusting unit adjusts an amount of resistance applied by the resistance applying unit.

30 Claims, 7 Drawing Sheets

(56) References Cited

U.S. PATENT DOCUMENTS

| | | | |
|---|---|---|---|
| 6,394,921 B1 * | 5/2002 | Fukuda | 474/80 |
| 6,561,334 B2 | 5/2003 | Stark | |
| 6,902,504 B2 * | 6/2005 | Fukuda | 474/83 |
| 2007/0219029 A1 | 9/2007 | Turner | |
| 2009/0054183 A1 | 2/2009 | Takachi | |
| 2009/0291789 A1 * | 11/2009 | Ishikawa et al. | 474/82 |

FOREIGN PATENT DOCUMENTS

| | | |
|---|---|---|
| DE | 69721453 T2 | 5/2003 |
| DE | 102005057299 A1 | 6/2007 |
| DE | 102007006517 A1 | 8/2007 |
| DE | 102007040156 A1 | 2/2009 |
| EP | 0031215 A2 | 7/1981 |
| EP | 791534 A2 | 8/1997 |
| EP | 1415902 A2 | 5/2004 |
| GB | 264964 | 2/1927 |
| GB | 376086 | 7/1932 |

OTHER PUBLICATIONS

Niemann, G. and Winter, H., "Maschinen-elemente Band III," 1983, pp. 274-277, published in Germany.
Ina-Schaeffler KG, "Hulsenfreilaufe," Feb. 2004, pp. 1-24, published in Germany.

* cited by examiner

BICYCLE REAR DERAILLEUR WITH A MOTION RESISTING STRUCTURE

BACKGROUND OF THE INVENTION

The present invention is directed to bicycle derailleurs and, more particularly, to a bicycle derailleur with a motion resisting structure.

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle rear derailleur.

Typically, a rear derailleur comprises a base member, a movable member movably coupled to the base member via a linkage assembly, and a chain guide movably coupled to the movable member. The base member is attached to the frame of the bicycle, and the chain guide is configured to move a chain laterally over a plurality of rear sprockets. A torsion spring biases the chain guide in a chain tensioning direction around an axle housed in the movable member so that the chain guide can apply a sufficient tension to the chain. Another spring, called a return spring, biases the movable member and the chain guide to an innermost or outermost position relative to the rear sprockets. A Bowden-type control cable is typically coupled to the rear derailleur and to a conventional shift control device so that the rider may control the lateral movement of the chain guide. Pulling an inner wire of the control cable moves the chain guide against the biasing force of the return spring, while releasing the inner wire allows the chain guide to move in accordance with the biasing force of the return spring.

When riding on rough terrain, the chain guide sometimes swings both in the chain tensioning direction and in the direction opposite to the chain tensioning direction, thereby causing the chain to bounce severely. Such bouncing of the chain sometimes causes the chain to derail from the currently engaged front and/or rear sprocket.

SUMMARY OF THE INVENTION

The present invention is directed to various features of a bicycle derailleur. In one embodiment, a bicycle derailleur comprises a base member adapted to be mounted to a bicycle, a movable member movably coupled to the base member, and a chain guide coupled to the movable member. The chain guide is coupled for rotation around a rotational axis (X), and a biasing element biases the chain guide in a selected rotational direction. A resistance applying unit applies a resistance to rotational movement of the chain guide in a direction opposite the selected rotational direction, and an adjusting unit adjusts an amount of resistance applied by the resistance applying unit. Additional inventive features will become apparent from the description below, and such features alone or in combination with the above features and their equivalents may form the basis of further inventions as recited in the claims.

DETAILED DESCRIPTION OF THE EMBODIMENTS

Figure 1:
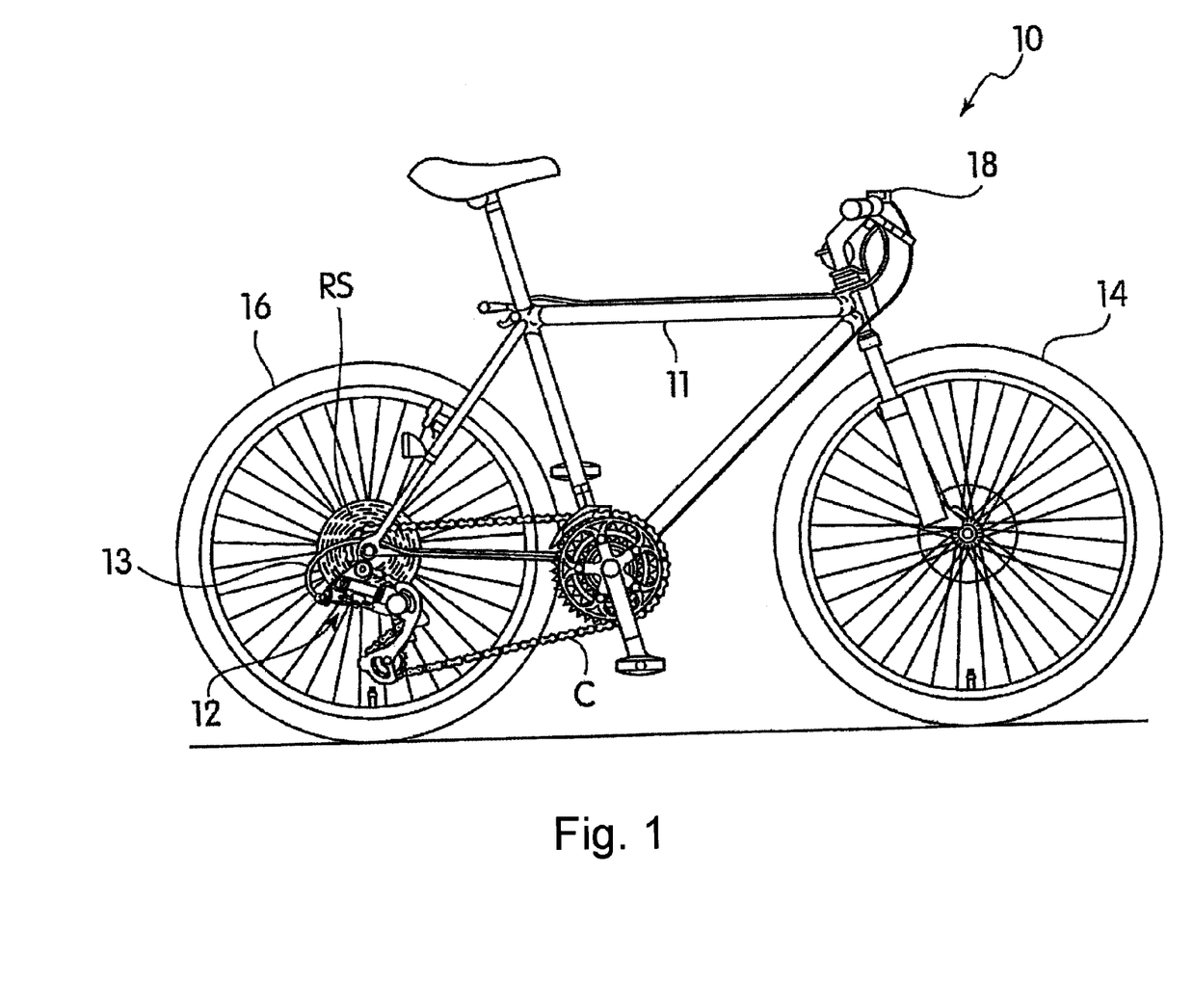
FIG. 1 is a side view of a bicycle that employs an embodiment of a rear derailleur.
Figure 2:
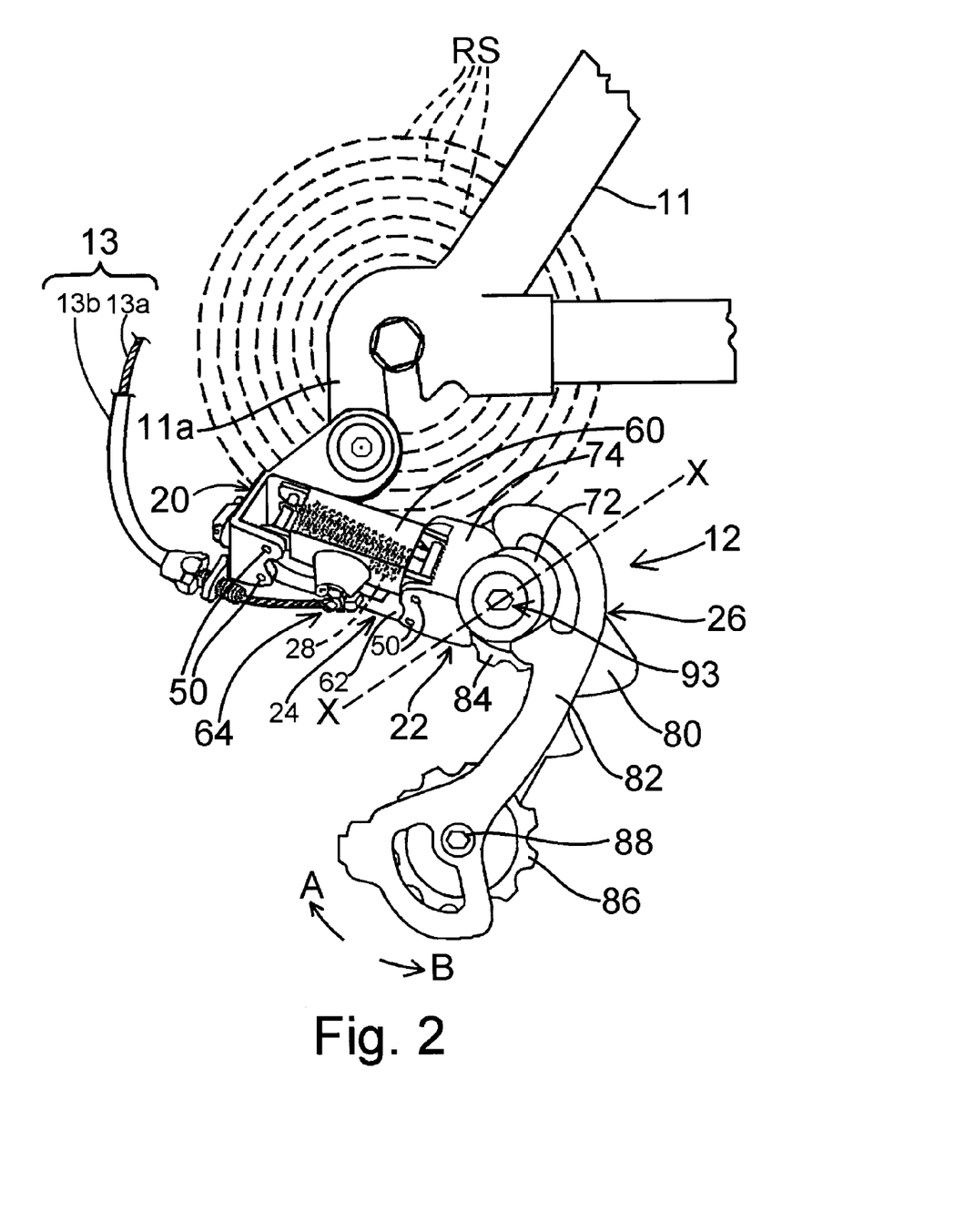
FIG. 2 is a more detailed view of the rear derailleur.

FIGS. 1 and 2 show a bicycle 10 equipped with a particular embodiment of a rear derailleur 12. Bicycle 10 is a conventional bicycle except for rear derailleur 12, so only rear derailleur 12 will be discussed in detail herein.

Bicycle 10 comprises a frame 11 with front and rear wheels 14 and 16 rotatably coupled to frame 11 in a conventional manner. The rear of frame 11 includes a rear derailleur mounting plate 11a, and rear derailleur 12 is directly attached to rear derailleur mounting plate 11a. Of course, many different rear derailleur mounting structures can be provided, such as a removable type derailleur hanger (not shown). Bicycle 10 further includes a conventional rear shift control device 18 mounted on a handlebar to control rear derailleur 12 via a Bowden-type shift control cable 13 that includes an inner wire 13a slidably disposed within an outer casing 13b. The rider operates shift control device 18 to selectively pull or release inner wire 13a to operate rear derailleur 12 to move a chain C laterally over a plurality of rear sprockets RS that are coupled to rear wheel 16.

As shown in FIG. 2, rear derailleur 12 comprises a base member 20, a movable member 22, a linkage assembly 24 and a chain guide 26. Base member 20 is structured to be mounted to rear derailleur mounting plate 11a, and linkage assembly 24 is coupled between base member 20 and movable member 22 so that chain guide 26 can move to a plurality of shift positions corresponding to the number of rear sprockets RS. A return spring 28 biases chain guide 26 either laterally inwardly or laterally outwardly relative to the plurality of rear sprockets RS, depending upon the application. In this embodiment, return spring 28 biases chain guide 26 laterally outwardly.

Linkage assembly 24 includes a pair of parallel links 60 and 62. Link 60 is an upper/outer link, while the link 62 is a lower/inner link. Links 60 and 62 are pivotally coupled to base member 20 and to movable member 22 through four pivot pins 50. The ends of return spring 28 are mounted on diagonally opposed pivot pins 50 to bias movable member 22 and chain guide 26 laterally outwardly toward the smallest rear sprocket. A cable attachment device 64 extends from a lower side of link 60 for the attachment of inner wire 13a.

Figure 3:
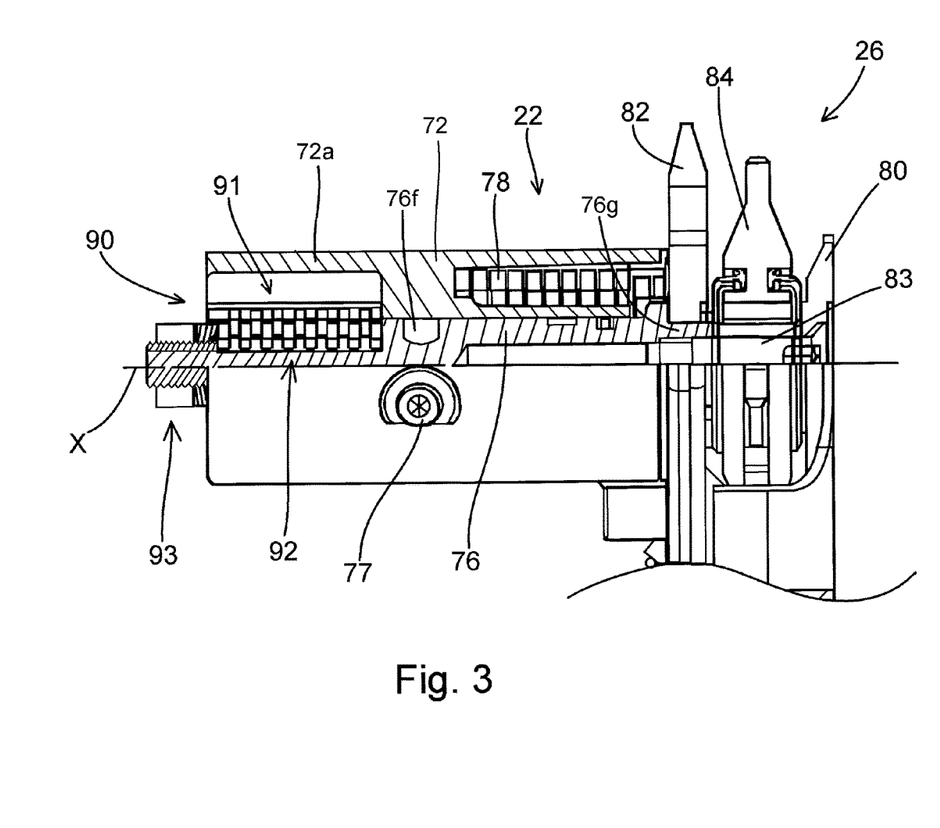
FIG. 3 is a partial cross-sectional view of a movable member that includes a particular embodiment of a motion resisting structure.

As shown in FIGS. 2 and 3, movable member 22 comprises a tubular housing 72 and a link attachment portion 74. Housing 72 is fixedly attached to (e.g., integrally formed with) link attachment portion 74 and houses a portion of a resistance applying unit 90 that is discussed in further detail below.

Figure 5:
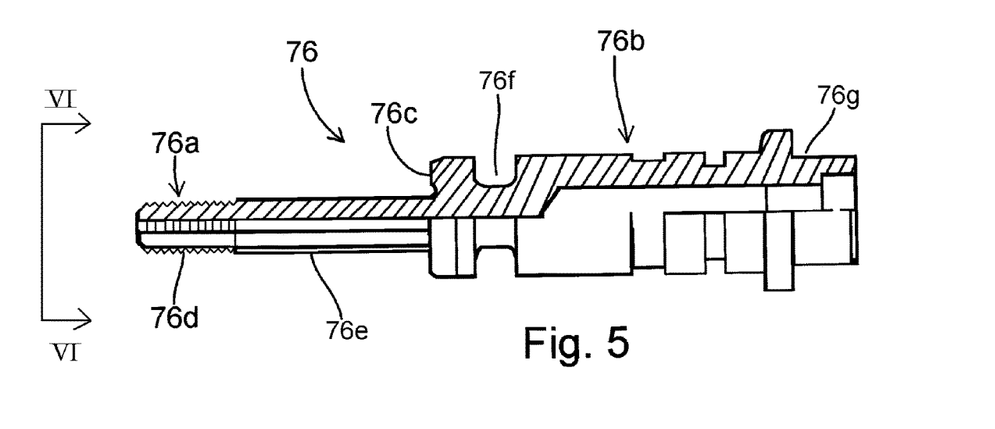
FIG. 5 is a partial cross-sectional view of a particular embodiment of a pivot shaft used in the derailleur.
Figure 6:
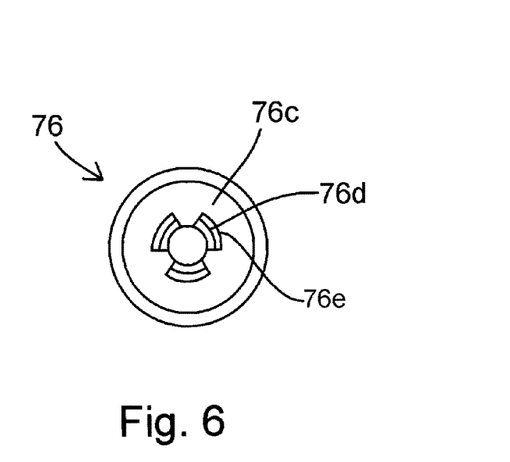
FIG. 6 is a view taken along line VI-VI in FIG. 5.

A pivot shaft 76 is disposed within housing 72. As shown in FIG. 5, pivot shaft 76 includes a first portion 76a and a second portion 76*b*, wherein first portion 76*a* has a smaller diameter than second portion 76*b* so that a step 76*c* is formed between first portion 76*a* and second portion 76*b*. When rear derailleur 12 is attached to bicycle 10, first portion 76*a* is arranged laterally outwardly of second portion 76*b*. An external thread 76*d* is disposed on the free end of first portion 76*a*, and a coupling structure 76*e* in the form of a plurality of splines is disposed on first portion 76*a* between external thread 76*d* and step 76*c*. FIG. 6 shows the structure of external thread 76*d* and coupling structure 76*e* in more detail. A circumferential groove 76*f* is disposed on second portion 76*b*. A screw 77 engages groove 76*f* to prevent axial movement of pivot shaft 76 while allowing pivot shaft 76 to rotate around a rotational axis X. An end portion 76*g* of pivot shaft 76 is press-fitted to an outer plate 82 of chain guide 26 so that chain guide 26 also rotates around axis X. A spring 78 is mounted around pivot shaft 76 within housing 72. In this embodiment, spring 78 is a torsion spring with one end coupled to housing 72 and the other end coupled to outer plate 82 of chain guide 26 to bias chain guide 26 in a selected rotational direction such as chain tensioning direction A shown in FIG. 2.

As shown in FIGS. 2 and 3, chain guide 26 comprises an inner plate 80, the outer plate 82, a guide pulley 84 and a tension pulley 86. A fixing bolt 83 screws into an inner bore of pivot shaft 76 to couple inner plate 80, outer plate 80 and guide pulley 84 to pivot shaft 76. Guide pulley 84 is rotatably supported by fixing bolt 83 and rotates around pivot axis X. A mounting screw 88 couples inner plate 80, outer plate 82 and tension pulley 86 together so that tension pulley 86 is rotatably supported by mounting screw 88.

Figure 4:
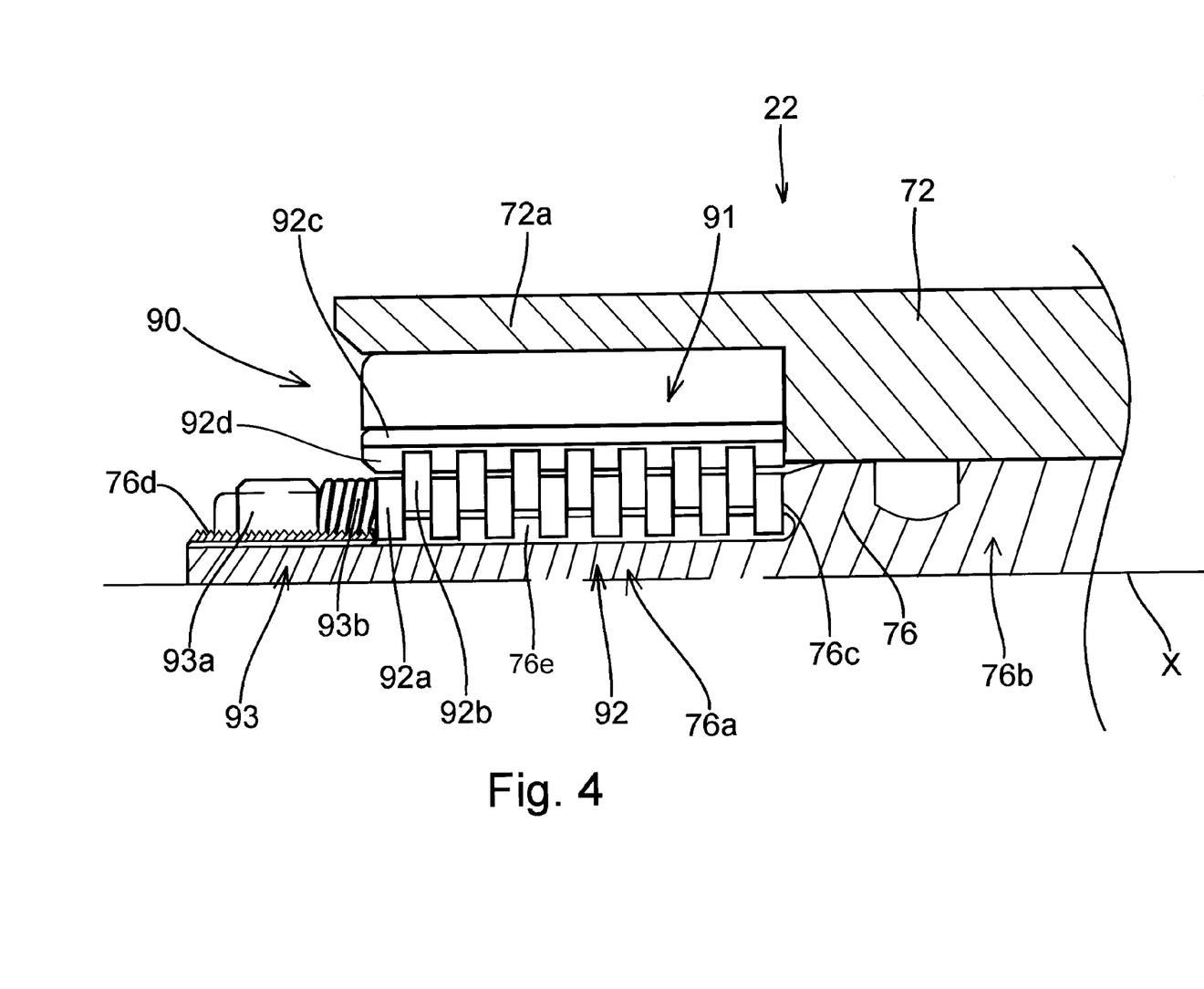
FIG. 4 is a more detailed view of the motion resisting structure.

Resistance applying unit 90 applies a resistance to pivotal movement of chain guide 26 in a rotational direction B (FIG. 2) opposite the chain tensioning direction A. As shown in FIGS. 3 and 4, resistance applying unit 90 in this embodiment comprises a friction unit 92, a one-way transmission unit 91 and an adjusting unit 93. Friction unit 92 comprises at least one first engaging member in the form of a first engaging plate 92*a*, for example, at least one second engaging member in the form of a second engaging plate 92*b*, for example, and a tubular intermediate retaining member 92*c*. In this embodiment, friction unit 92 comprises a plurality of (e.g., eight) first engaging plates 92*a* and a plurality of (e.g., seven) second engaging plates 92*b*, wherein each first engaging plate 92*a* and each second engaging plate 92*b* comprises a friction plate.

Figure 8:
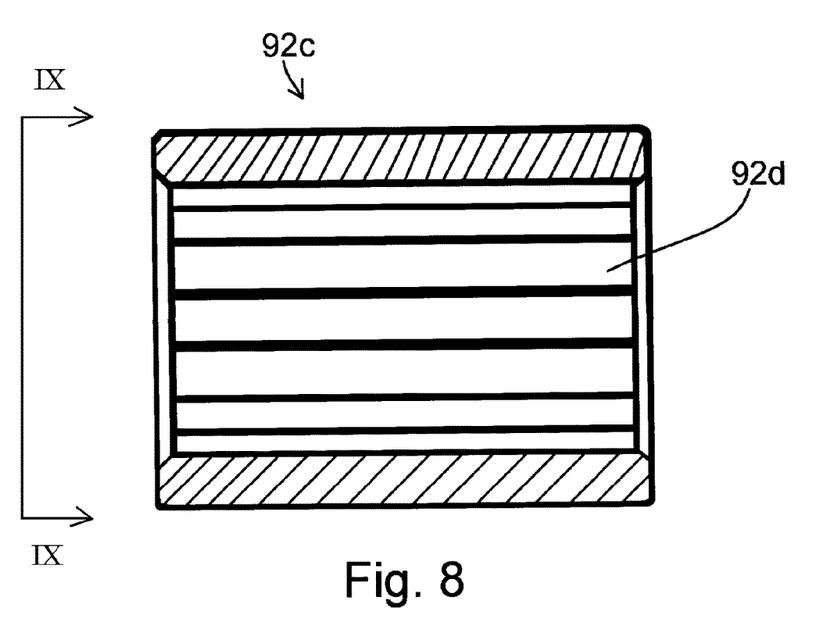
FIG. 8 is a cross sectional view of a particular embodiment of a tubular intermediate retaining member.
Figure 9:
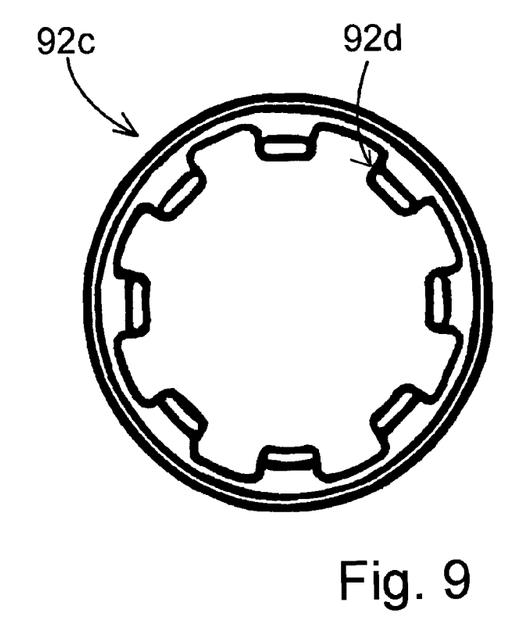
FIG. 9 is a view taken along line IX-IX in FIG. 9.

As shown in FIGS. 8 and 9, intermediate retaining member 92*c* surrounds coupling structure 76*e* of pivot shaft 76 and is housed within a tubular end wall 72*a* of housing 72. A coupling structure 92*d* in the form of a plurality of radially inwardly extending splines, for example, is formed on the inner peripheral surface of intermediate retaining member 92*c*.

Figure 7:
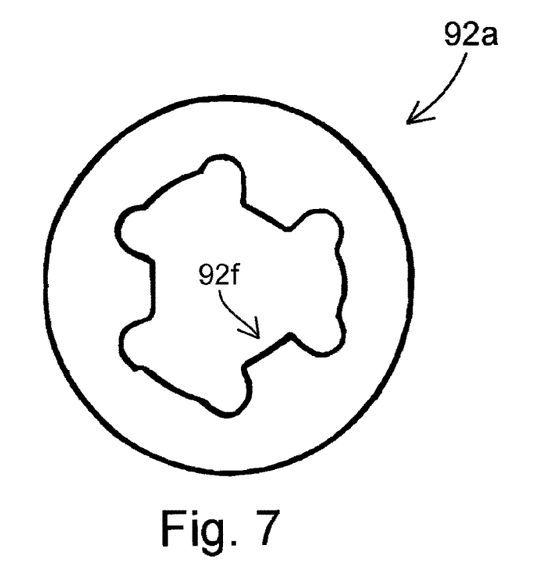
FIG. 7 is a side view of a particular embodiment of a first engaging plate.

As shown in FIG. 7, first engaging plate 92*a* is a ring-shaped member having a coupling structure 92*f* in the form of a plurality of radially inwardly extending splines, for example. Coupling structure 92*f* is dimensioned to engage coupling structure 76*e* on pivot shaft 76, so that pivot shaft 76 functions as a retaining member for first engaging plate 92*a*. As a result, the plurality of first engaging plates 92*a* are non-rotatably but axially slidably attached to pivot shaft 76.

Figure 10:
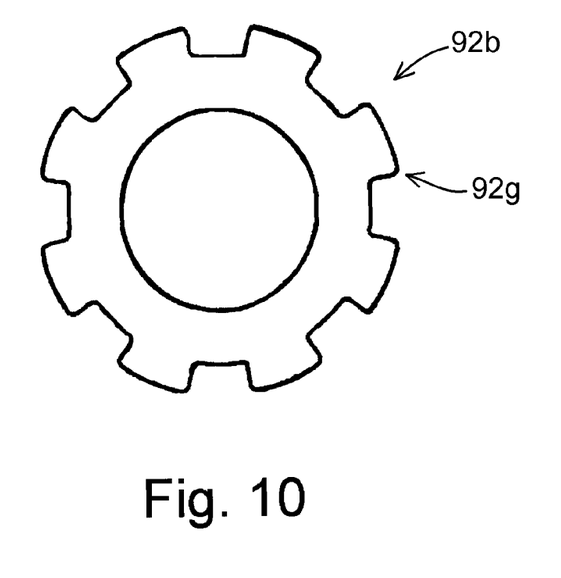
FIG. 10 is a side view of a particular embodiment of a second engaging plate.

As shown in FIG. 10, second engaging plate 92*b* is a ring-shaped member having a coupling structure 92*g* in the form of a plurality of radially outwardly extending splines, for example. Coupling structure 92*g* is dimensioned to engage coupling structure in 92*d* on intermediate retaining member 92*c*. As a result, the plurality of second engaging plates 92*b* are non-rotatably but axially slidably attached to intermediate retaining member 92*c*.

As shown in FIG. 4, the plurality of first engaging plates 92*a* alternate with the plurality of second engaging plates 92*b* so that the inner portions of the plurality of second engaging plates 92*b* contact the outer portions of the plurality of first engaging plates 92*a*. As a result, the first and second engaging plates 92*a* and 92*b* operatively couple pivot shaft 76 to intermediate retaining member 92*c*. In this embodiment, the contact area between each first and second engaging plate 92*a* and 92*b* is relatively small. However, providing a plurality of first and second engaging plates 92*a* and 92*b* allows the total contact area between the first and second engaging plates 92*a* and 92*b* to be effectively increased without increasing a radial dimension of housing 72. As a result, movable member 22 in particular and rear derailleur 12 in general can be made more compact. The plurality of first engaging plates 92*a* and the plurality of second engaging plates 92*b* can be made of any suitable material that provides the desired amount of friction therebetween. In this embodiment, the first and second engaging plates 92*a* and 92*b* comprise an aluminum alloy.

Adjusting unit 93 is disposed on (e.g., around) pivot shaft 76 and is provided to adjust the biasing force applied to friction unit 92. As in FIG. 4, adjusting unit 93 comprises an adjusting element 93*a* and a biasing element 93*b*. Adjusting element 93*a* may have the form of an adjusting nut that is screwed onto external thread 76*c* of pivot shaft 76*a*, and biasing element 93*b* may have the form of a spring 93*b* disposed between adjusting element 93*a* and friction unit 92. In this embodiment, biasing element 93*b* provides a biasing force against the outermost first engaging plate 92*a* of the friction unit 92. Consequently, turning adjusting element 93*a* moves adjusting element 93*a* in the direction of rotational axis X to increase or decrease the biasing force of biasing element 93*b*, thereby adjusting the amount of friction between the plurality of first engaging plates 92*a* and the plurality of second engaging plates 92*b*. In this embodiment, the frictional force is increased by moving adjusting element 93*a* inwardly (i.e. toward bicycle 10), while the frictional force is decreased by moving adjusting element 93*a* outwardly (away from bicycle 10). Housing 72 of movable member 22 is configured to expose a portion of pivot shaft 76 and adjusting element 93*a* so that the rider can easily access adjusting element 93*a*.

As shown in FIG. 4, one-way transmission unit 91 is disposed between intermediate retaining member 94 and tubular end wall 72*a* of housing 72. In this embodiment, one-way transmission unit 91 comprises a roller clutch unit, the structure of which is well-known. One-way transmission unit 91 is arranged such that rotational force in the chain tensioning direction A from intermediate retaining member 92*c* is not transmitted to tubular end wall 72*a* of housing 72. Thus, when chain guide 26 rotates in the chain tensioning direction A, pivot shaft 76 rotates freely in the chain tensioning direction A together with chain guide 26, and intermediate retaining member 92*c* rotates with pivot shaft 76 due to the frictional force of friction unit 92 without transmitting the rotational force to housing 72.

On the other hand, when chain guide 26 is subjected to a rotational force in the rotational direction B, the rotational force is communicated to pivot shaft 76 and to intermediate retaining member 94 through the plurality of first engaging plates 92*a* and the plurality of engaging plates 92*b*. This time, the rotational force is communicated to housing 72 through one-way transmission unit 91. Since housing 72 is not rotatable, intermediate retaining member 92*c* cannot rotate in rotational direction B. As a result, chain guide 26 and pivot shaft 76 also do not rotate. However, if the force in the rotational direction B is sufficiently strong, then the rotational force will cause the plurality of first engaging plates 92a to slide relative to the plurality of second engaging plates 92b, but the friction between the plurality of first engaging plates 92a and the plurality of second engaging plates 92b continuously resists such movement, thereby providing damping the rotation of pivot shaft 76 and chain guide 26 in the rotational direction B. The degree of resistance is adjusted easily by moving adjusting element 93a depending on the rider's preference.

While the above is a description of various embodiments of inventive features, further modifications may be employed without departing from the spirit and scope of the present invention. For example, while a mechanical (i.e., cable actuated) rear derailleur was described, the teachings herein can be employed with other types of derailleurs such as pneumatic derailleurs, motorized/electrical derailleurs and/or electromechanical derailleurs. While a roller clutch was provided as an example of a one-way transmission unit, other types of one-way transmission units, such as a ratchet and pawl type one-way transmission unit, could be used. While the teachings herein were applied to the movable member of the derailleur, the teachings herein also could be applied to the base member of the derailleur or to some other structure that could prevent undesirable movement of the chain guide, in which case the rotational axis X would be located at that structure, and the chain guide would rotate around that rotational axis X accordingly.

The terms "part," "section," "portion," "member" or "element" when used in the singular can have the dual meaning of a single part or a plurality of parts. The terms "forward, rearward, above, downward, vertical, horizontal, below and transverse" as well as any other similar directional terms refer to of a bicycle equipped with the structures described herein in the normal upright riding position. The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. For example, such terms may include a deviation of at least ±5% of the modified term as long as such a deviation would not negate the meaning of the word it modifies. Thus, the scope of the invention should not be limited by the specific structures disclosed or the apparent initial focus or emphasis on a particular structure or feature.

What is claimed is:

1. A bicycle derailleur comprising:
a base member adapted to be mounted to a bicycle,
a movable member movably coupled to the base member;
a chain guide coupled to the movable member;
wherein the chain guide is coupled for rotation around a rotational axis (X);
a biasing element that biases the chain guide in a selected rotational direction around the rotational axis (X);
a resistance applying unit that applies a resistance to rotational movement of the chain guide in a direction opposite the selected rotational direction; and
an adjusting unit that adjusts an amount of resistance applied by the resistance applying unit in the direction opposite the selected rotational direction, wherein the adjusting unit can be accessed without removing the chain guide from the movable member so that the amount of resistance applied by the resistance applying unit can be adjusted by a person who manipulates the adjusting unit, and wherein the amount of resistance applied by the resistance applying unit can be adjusted by a person who manipulates the adjusting unit without manipulating the biasing element to access the adjusting unit.

2. The derailleur according to claim 1 wherein the resistance applying unit includes a one-way transmission unit.

3. The derailleur according to claim 1 wherein the adjusting unit comprises:
a biasing element that applies a biasing force to the resistance applying unit; and
an adjusting element that adjusts an amount of biasing force applied to the resistance applying unit by the biasing element.

4. The derailleur according to claim 1 wherein the resistance applying unit comprises a friction unit, and wherein the adjusting unit is structured to adjust an amount of friction applied by the friction unit.

5. The derailleur according to claim 4 wherein the friction unit includes at least one first engaging member that engages at least one second engaging member.

6. The derailleur according to claim 5 wherein the friction unit includes:
a plurality of the first engaging members;
a plurality of the second engaging members; and
wherein the plurality of first engaging members alternate with the plurality of second engaging members.

7. The derailleur according to claim 5 wherein the first engaging member is non-rotatably but axially slidably attached to a first retaining member, and wherein the second engaging member is non-rotatably but axially slidably attached to a second retaining member.

8. The derailleur according to claim 7 wherein the first engaging member has an inner coupling structure that mates with a first coupling structure formed on the first retaining member, and wherein the second engaging member has an outer coupling structure that mates with a second coupling structure formed on the second retaining member.

9. The derailleur according to claim 8 wherein the first retaining member comprises a pivot shaft, and wherein the second retaining member comprises a first tubular member.

10. The derailleur according to claim 9 wherein the resistance applying unit includes a one-way transmission unit disposed at the first tubular member.

11. The derailleur according to claim 9 wherein the rotational axis X is disposed at the chain guide so that the resistance applying unit is disposed at the chain guide.

12. The derailleur according to claim 11 wherein the movable member includes a second tubular member, and wherein a one-way transmission unit is disposed between the first tubular member and the second tubular member.

13. The derailleur according to claim 11 wherein the movable member includes a second tubular member, and wherein at least portions of the pivot shaft and the resistance applying unit are disposed within the second tubular member.

14. The derailleur according to claim 11 wherein the adjusting unit comprises:
a biasing element that applies a biasing force to the friction unit; and
an adjusting element that adjusts an amount of biasing force applied to the friction unit by the biasing element.

15. The derailleur according to claim 14 wherein the biasing element is disposed between the adjusting element and the friction unit.

16. The derailleur according to claim 15 wherein the adjusting unit is disposed on the pivot shaft.

17. The derailleur according to claim 16 wherein the pivot shaft includes a first portion and a second portion, wherein the first portion has a smaller diameter than the second portion so that a step is formed between the first portion and the second portion.

18. The derailleur according to claim 17 wherein the first portion is disposed laterally outwardly from the second portion.

19. The derailleur according to claim 18 wherein at least one of the adjusting unit or the friction unit is disposed on the first portion.

20. The derailleur according to claim 19 wherein the friction unit is disposed between the adjusting unit and the step.

21. The derailleur according to claim 1 wherein the adjusting unit is distinct from the resistance applying unit.

22. The derailleur according to claim 1 wherein the adjusting unit is operable from outside of the movable member.

23. The derailleur according to claim 22 wherein the adjusting unit comprises a member that can be manually rotated from outside of the movable member.

24. The derailleur according to claim 22 wherein the adjusting unit comprises a threaded member that can be manually rotated from outside of the movable member.

25. The derailleur according to claim 22 wherein the adjusting unit is operable from laterally outwardly from the movable member.

26. The derailleur according to claim 1 wherein the adjusting unit comprises an adjusting element that moves relative to the movable member to adjust the amount of resistance applied by the resistance applying unit.

27. The derailleur according to claim 1 wherein the adjusting unit comprises an adjusting element that can be accessed by the person from outside of the movable member to adjust the amount of resistance applied by the resistance applying unit.

28. The derailleur according to claim 27 wherein the adjusting element is disposed outside of the movable member.

29. The derailleur according to claim 27 wherein the adjusting element comprises a threaded member that moves relative to the movable member.

30. The derailleur according to claim 1 wherein the portion of the adjusting unit manipulated by the person to adjust the amount of resistance applied by the resistance applying unit is disposed outside of the biasing element.

* * * * *